United States Patent [19]

Arvanitakis

[11] 3,959,143

[45] May 25, 1976

[54] APPARATUS FOR FILTERING COOKING LIQUIDS

[76] Inventor: Kostas Savas Arvanitakis, 14945 S. Dogwood Ave., Orland Park, Ill. 60462

[22] Filed: July 11, 1974

[21] Appl. No.: 487,608

[52] U.S. Cl. ............................ 210/196; 210/304; 210/327; 210/415
[51] Int. Cl.² ................... B01D 33/28; B01D 37/02
[58] Field of Search .......... 210/167, 196, 327, 334, 210/357, 413, 414, 415, 193, 304

[56] References Cited
UNITED STATES PATENTS

| | | | |
|---|---|---|---|
| 1,951,809 | 3/1934 | Renfrew | 210/196 X |
| 2,269,725 | 1/1942 | Malanowski | 210/327 |
| 3,020,950 | 2/1962 | Schraivogel | 210/304 X |
| 3,202,284 | 8/1965 | Wade | 210/304 X |
| 3,497,452 | 2/1970 | Arvanitakis | 210/167 X |
| 3,705,648 | 12/1972 | Arvanitakis | 210/415 X |

FOREIGN PATENTS OR APPLICATIONS

| | | | |
|---|---|---|---|
| 489,024 | 10/1936 | United Kingdom | 210/196 |

Primary Examiner—Charles N. Hart
Assistant Examiner—Robert H. Spitzer
Attorney, Agent, or Firm—August E. Roehrig, Jr.

[57] ABSTRACT

A portable filtration apparatus particularly adapted to remove solid and chemical contaminants from hot cooking liquids used in deep fryers, having a frame, a filter bowl mounted on the frame, a plurality of horizontal filter elements mounted on a hollow, vertical tube within the filter bowl, each of the filter elements having a corresponding cleaning means mounted adjacent it to engage and remove spent filter cake and contaminants from a filtering surface of the element when desired, and a pump mounted on the frame for continuously recirculating liquid through the filtering apparatus or returning filtered liquid to the deep fryer, as controlled by movement of a single valve. The filter elements are rotatable about a central axis of the tube within the filter bowl relative to the stationary cleaning means disposed across the surface of each element, to automatically remove spent filter cake and contaminants and eject them from an opening formed in the bowl.

19 Claims, 3 Drawing Figures

APPARATUS FOR FILTERING COOKING LIQUIDS

BACKGROUND OF THE INVENTION

This invention relates to filtering apparatus used to remove particulate and chemical contaminants from liquids, and in particular from hot cooking oils and fats used in deep fryers.

Deep fryers are used extensively to prepare certain foods such as French fried potatoes, fish and the like, in restaurants, drive-ins and other eating places. Such a fryer ususally includes a tank or container filled with cooking oil or fat which is heated to a temperature of approximately 375°. The food to be fried is then immersed for a predetermined time in the hot oil or fat. Deep frying, however, causes fat to break down and food particles to burn, chemically forming acids and carbon particles which lend an undesirable taste and color to the food and often cling to it. Accordingly, cooking oils and fats lose their effectiveness as cooking mediums after relatively short periods of use. Even with regular straining, the cooking medium will still contain a large amount of burnt particles, chemical contaminants, and import objectionable odors and taste.

Therefore, it has become popular to pass or circulate hot cooking oils or fats through a filtration apparatus to attempt to remove these contaminants and odors. While various filtration apparatus have been devised to remove such contaminants, many of these devices are incorporated into the deep fryer itself and are prohibitive in cost for a small fast food operation having several deep fryers. Other devices are relatively complex in construction and operation, using differential pressures, centrifugal force, or carbon, micron or graded filters to remove contaminants. Other filter apparatus use filter bags or screens which are easily clogged, require constant cleaning or disposal, and are not effective to remove all the contaminants and odors. Many prior filtration apparatus have also required constant manual cleaning of the filter, involving additional time and expense.

SUMMARY OF THE INVENTION

The present invention is directed to a novel portable filter apparatus for removing chemical and particulate contaminants from cooking oils and fats, having horizontally disposed filter elements which are rotatable relative to associated cleaning elements to remove filtered-out contaminants from the surface of the filter elements as desired to preserve the filtering efficiency of the apparatus. This invention includes a pump which is operable to recirculate the cooking liquid through the filter elements to assure complete removal of contaminants and to return such filtered liquid to the deep fryer when filtration has been satisfactorily completed.

This invention overcomes the problems of the prior art by providing an apparatus which is compact, easily cleaned, mechanically simple in operation, and movable from location of one fryer to another so that many fryers may be serviced in a short period of time. It uses a filter element which supports a cake of diatomaceous earth on a filtering surface to form a natural filter allowing liquid to pass through but blocking the passage of acid and particulate contaminants and removing objectionable tastes and odors from the cooking liquid. A pump provides for continuous operation of the filter by recirculation of the liquid, and eliminates handling of the hot cooking oils, which create potential dangers to operators.

This invention includes a generally circular filter bowl for containing cooking liquid drawn from the deep fryer, which has a central, hollow mounting tube positioned therein. On this tube are mounted a plurality of horizontal filter elements of known design having a heavy supporting member, a wire or fiber filter septum laid over the supporting member which supports the filter cake, and a bottom plate member which causes filtered liquid to drain inwardly toward an opening formed in the hollow mounting tube from where it is drained toward an outlet in the bottom of the bowl.

Each filter member has a cleaning means associated therewith which includes a generally radially extending arm having an inward end supported from the central mounting tube and extending outwardly across the filtering surface, abutting a stationary stop post near its outward end. The radially extending arm has a number of brushes or a flexible wiper mounted on each side of it, one set of which engage the filter surface of its associated filter element. When the contaminants have been removed from the cooking liquid and accumulated on the filter cake, a drive means operatively connected to the filter elements rotates them relative to the cleaning means. The filter brushes frictionally remove spent filter cake and contaminants from the filter septum without damaging it. The spent filter cake and contaminants will be forced outwardly off each filter element by the associated cleaning means and dropped to the bottom of the filter bowl at a point near an access opening formed in the filter bowl so that they may be easily removed for disposal.

In small applications, a filtration apparatus having a single stationary filter element may be desirable. A hand-operated scoop having a positioning ring is placed over the filter and moved relative to the filter surface to remove spent filter cake and contaminants.

The cooking oil inlet in the filter bowl is positioned at an angle relative to the horizontally disposed filter elements on a banked portion of the filter bowl and is associated with a diverting baffle so that as the oil is pumped into the bowl, a vortex entry effect is created which greatly increases the uniformity of the liquid distribution over the filters and the efficiency of the filtration apparatus.

Accordingly, it is an object of the present invention to provide a filtration apparatus which is simple in construction and operation and portable to permit use with a plurality of deep fryer units.

It is another object of the present invention to provide a filtration apparatus having one or more horizontally disposed filter elements, each of the filter elements having an associated cleaning means to permit automatic cleaning of the filtering surface of each element.

It is a further object of the present invention to provide a portable filtration apparatus which allows recirculation of the cooking oil through the apparatus until complete removal of particulate and chemical contaminants has been obtained.

It is still another object of the present invention to provide a portable filtration apparatus having a means to inject cooking oil into the filter bowl containing the filter elements in a manner to produce a vortex entry effect to promote efficient filtration.

These and other objects of the present invention will become more apparent from the following description taken in conjunction with the drawings wherein.

DESCRIPTION OF THE INVENTION

Figure 1:
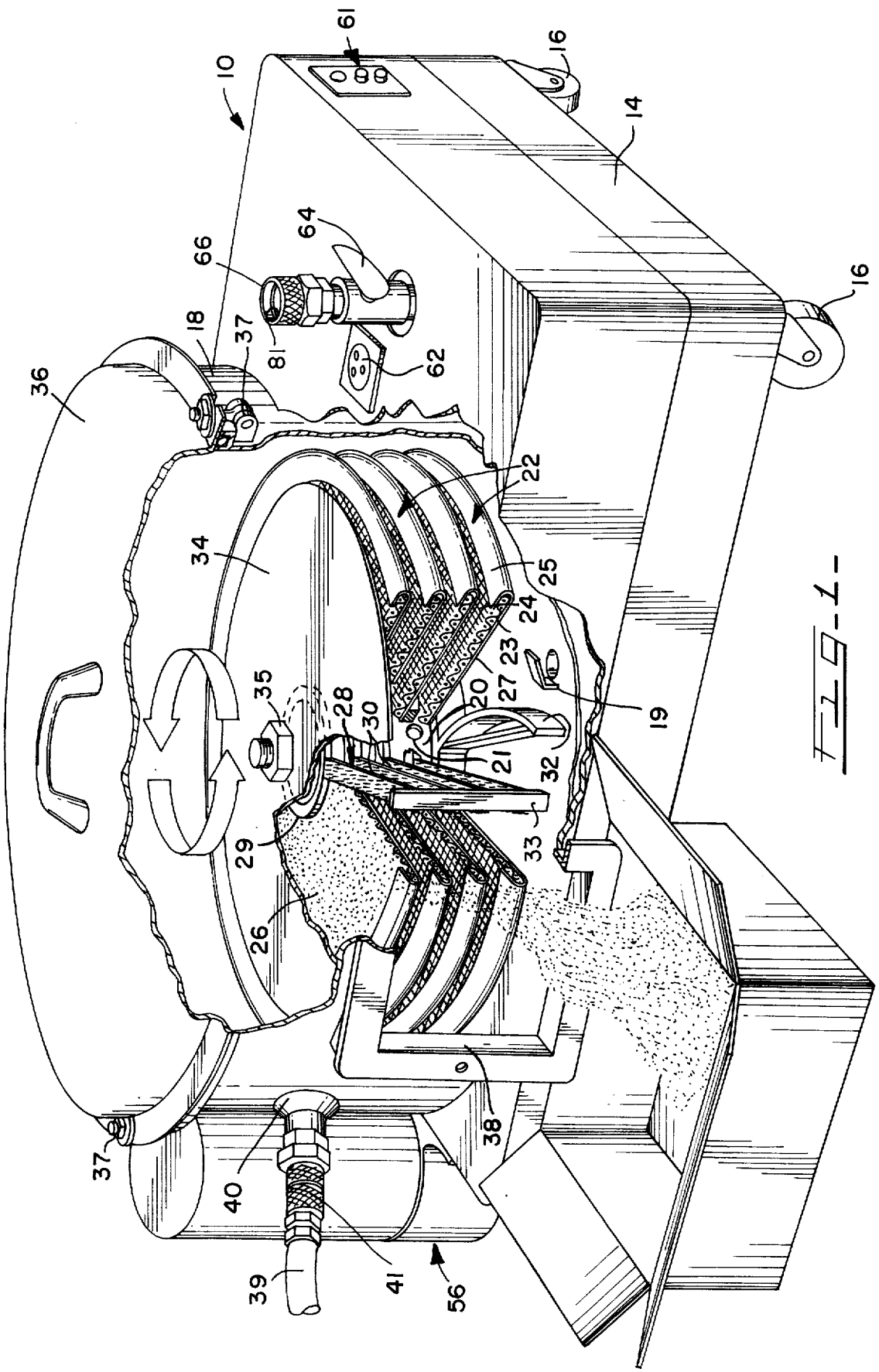
FIG. 1 is a perspective view of one embodiment of the apparatus for filtering liquids of the present invention, showing in cutaway a stacked filter arrangement with a semiautomatic cleaning apparatus.

Referring now to the drawings and, in particular, to FIG. 1, a semiautomatic, portable apparatus for filtering cooking liquids according to the present invention is shown in general at 10.

This filter apparatus 10 includes a frame 12 and a plurality of wheels 16, one mounted under each corner of the frame to provide the feature of portability which is necessary in efficiently servicing a number of deep fryers in a restaurant or food operation. The frame 12 and the components of the filter apparatus, which will be described below, are generally enclosed by a cover 14 to provide an apparatus which is neat in appearance, and easily cleaned. Mounted on the frame 12 is a filter bowl 18 for receiving and containing the cooking liquid from a deep fryer which is to be filtered, cleaned and returned to the fryer for further, extended cooking use. Bowl 18 contains a generally vertical, hollow mounting tube 20 having a plurality of openings or ports 21 formed therein. This mounting tube supports one or more spaced filter elements 22, as shown in FIGS. 1 and 2, and is mounted for rotation within and relative to bowl 18, in this semiautomatic embodiment.

Each filter element 22 contains a heavy gauge support screen 23 formed from a flat sheet of material folded in an accordian-like fold, radiating outward from the center and tapering to a point at the outer edge, or a heavy gauge mesh. This support screen 23 is covered with a fine mesh screen or septum 24 to support a top filter cake surface 26 formed on the septum 23. This fine mesh screen or septum 24 covering support structure 23 is of a mesh size which may be varied, depending upon the size of the particular solid particles suspended in the liquid to be filtered. The lower side of the filter element is closed by metal plate 27 and the peripheral edges of plate 27, screen 23 and septum 24 are bridged by a continuous end cap 25. Filter element 22 functions so that the liquid to be filtered is forced downwardly through the filter cake 26, formed of a diatomaceous earth or the like, through the septum 24, and then directed inward radially toward the interior, open edge of filter element 22. This open edge is vertically aligned with one or more of the ports or openings 21 in the mounting tube 20 so that the filtered liquid flows into the tube 20 and through the system.

Figure 2:
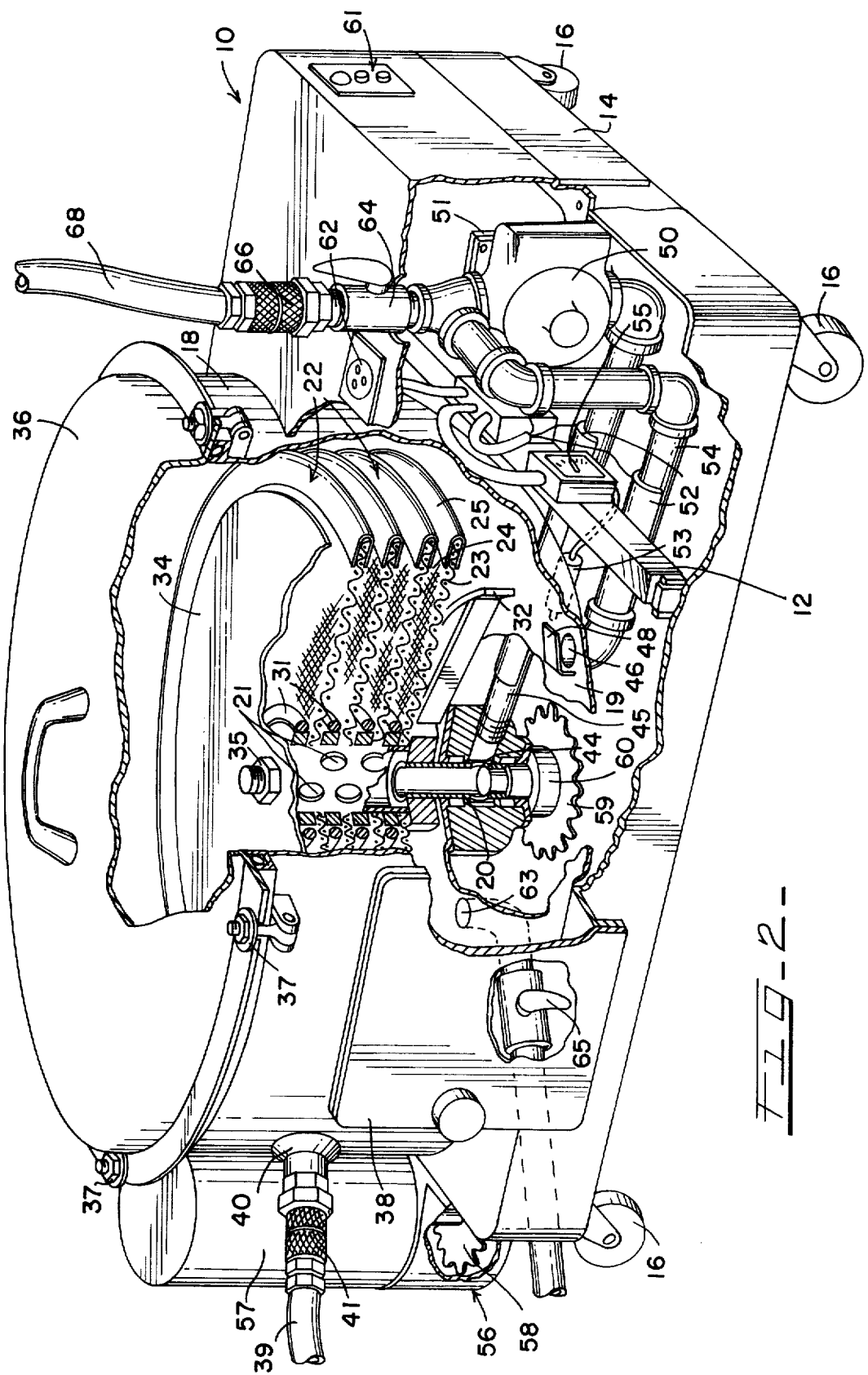
FIG. 2 is a perspective view of the present invention as shown in FIG. 1, cut away to show the filtering means, internal piping and the pumping mechanisms; and, FIG. 3 is a further embodiment of the present invention having a single filter element and a manual cleaning apparatus as shown in cutaway view.

In the embodiment shown in FIGS. 1 and 2, each filter element 22 has associated with it a cleaning means 28 which includes a radially extending arm 29 carried by a circular mounting ring 31 which is mounted on the mounting tube 20. Brush portions 30, composed of nylon bristles, are mounted above and below arm 29. The cleaning means 28, which are held stationary by a stop arm 33, act in co-operation with their associated filter elements 22, as these filter elements rotate with mounting tube 20, as shown in FIG. 2, to remove spent filter cake and filtered material 26 from the top surface of each filtering element 22 to the bottom 19 of bowl 18 for disposal. A more complete description of a particular filtration apparatus in which the above-described cleaning means and filter elements may be used in co-operative relationship is set forth in U.S. Pat. No. 3,705,648 entitle "Filtration System", issued by the U.S. Pat. Office on Mar. 30, 1974, in the name of Kostas Savas Arvanitakis. The disclosure of U.S. Pat. No. 3,705,648 is completely incorporated herein by reference thereto.

In the semiautomatic embodiment of the present invention shown in FIGS. 1 and 2, a scraper 32 formed of a flexible and corrosion-resistant material such as nylon, Telflon or the like is also mounted on mounting tube 20, for movement therewith while engaging the bottom 19 of filter bowl 18. The portion of scraper 32 in contact with the bottom of the filter bowl acts to continuously scrape and move material deposited on the bottom 19 toward a disposal door 38 formed in the side of bowl 18. A top plate 34 is positioned by top bolt 35 on mounting tube 20 over filter elements 22. The outward ends of the cleaning means 28 are positioned adjacent disposal door 38 so that the spent filter cake and the filtered material removed by these cleaning means upon rotation of the filter elements will be deposited adjacent that door or in a disposal box placed near the door, as shown in FIG. 1.

In the operation of the semiautomatic filter apparatus 10, shown in FIGS. 1 and 2, a filter bowl cover 36 is first affixed to the top of the filter bowl by means of hinged lugs 37 to prevent splattering of hot liquid. The cooking liquid is then drained from a deep fryer or the like through a flexible hose or tube 39 connected to a bowl inlet 40 by a suitable snap connection 41, into the filter bowl 18. The hot liquid will then tend to gravity filter through the filter elements 22, as described above and into mounting tube 20 through ports 21. The filtered liquid will then flow downwardly through the tube 20 to filter outlet 44. From filter outlet 44 the once-filtered liquid will pass through an outlet conduit or pipe 45, preferably formed of material which is resistant to high temperatures and corrosion, such as steel, stainless steel or steel alloys, to a pump 50 operated by pump motor 51.

With the valve 64, which may be a three-way valve, a ball valve or suitable equivalent, moved to a recirculate position, the pump 50 acts to recirculate the initially filtered cooking liquid through a return conduit 54 to return it to filter bowl 18. This liquid is pumped back into bowl 18 through filter inlet opening 46, preferably mounted in a side of the bowl and covered with a diverter plate or baffle 48. Inlet opening 46 could also be oriented tangentially to the interior surface of the bowl. The use of a diverter or tangentially oriented inlet 46 will act to inject the cooking liquid into the bowl in an indirect manner so that the filter elements 22 are not damaged, and will also create a vortex effect around the circular bowl, achieving a uniform distribution of the liquid and facilitating filtration.

The temperature of the liquid may be regulated by the heating system shown in FIG. 2. Conduits 45 and 54 may be heated by heating plates or equivalent means 52 when the temperature sensed by a capillary heat sensing element 53 indicates the liquid, particularly shortening, needs heat to maintain its fluidity for pumping and filtration. The heating plates 52 are controlled by a thermostat 55. The power to operate the pump motors, and heating plates 52 is supplied by plug-in connection to an available electrical source through electrical outlet 62 mounted on the cover 14. Operation of the pump and heating system means is accomplished through controls 61 on the side of the filter apparatus.

After filtration of cooking liquid from one or more deep fryers, it is usually necessary to clean the filter elements 22 of spent filter cake and accumulate grease and foreign matter 26, which would otherwise reduce filtration efficiency. In the semiautomatic embodiment of the present invention shown in FIGS. 1 and 2, therefore, a drive assembly 56 is provided which includes a motor 57, a motor gear 58 and a mounting tube gear 59. Means, such as a chain or belt (not shown), are also provided to operatively connect the motor gear 58 and mounting tube gear 59. The mounting gear 59 includes a boss insert 60 for fixed connection to mounting tube 20. Since insert 60 and tube 20 are mounted by bushings or by equivalent means, in bowl 18, the rotation of tube gear 59 will cause the mounting tube 20 and the attached filter elements 22 and scraper 32 to also rotate relative to bowl 18. This will move the filter elements 22 against the brushes 30 of the cleaning means 28 which are prevented from rotating, to remove spent filter cake, grease and debris from the top surfaces of the filter and direct this residue outwardly on the filter elements until it drops to the bottom 19 of the bowl and is collected near door 38 for removal. A drain 63 having a drain valve 65 permits removal of any non-returned liquid from the filter bowl for complete cleaning.

Figure 3:
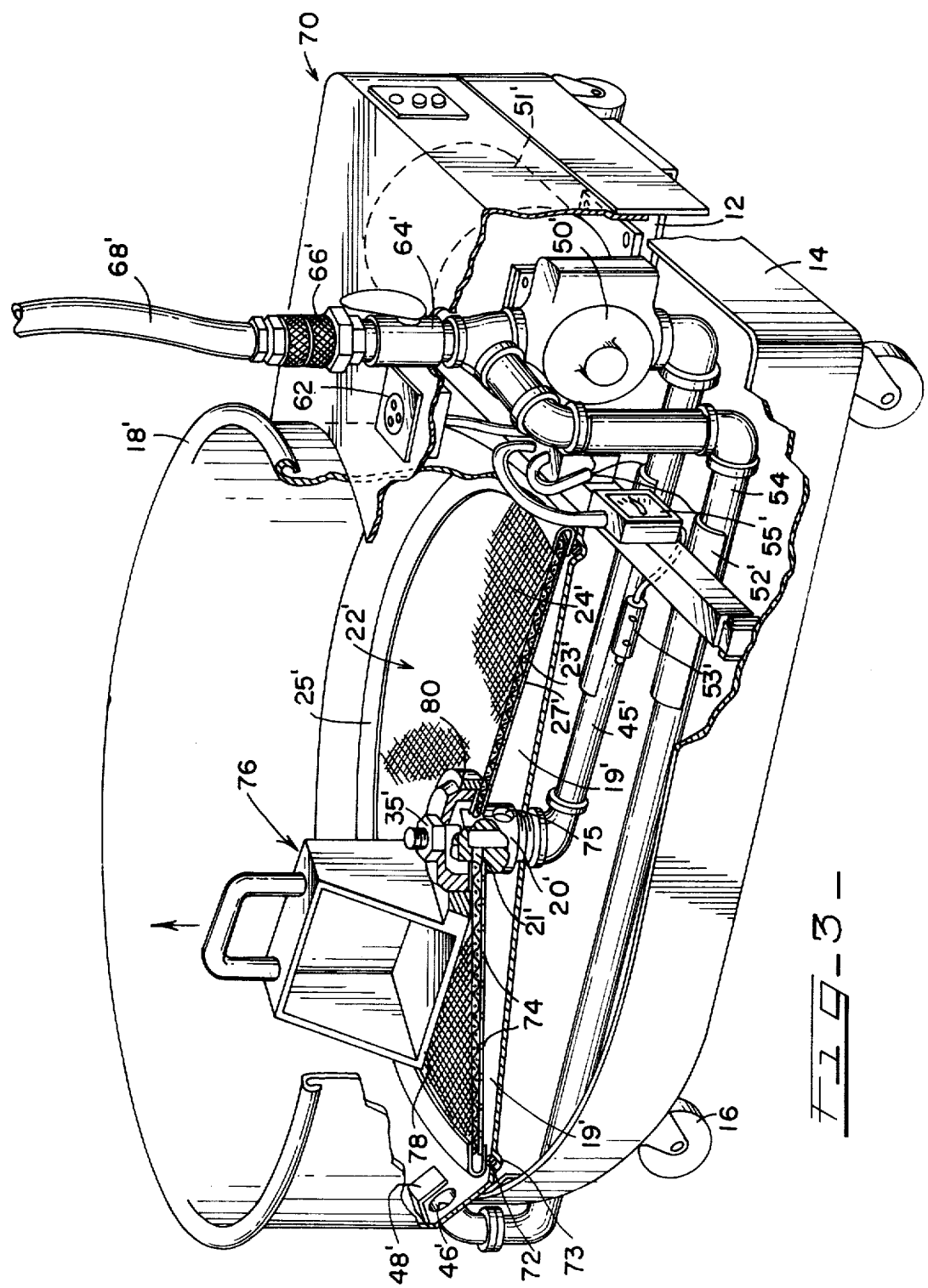

FIG. 3 shows a simplified, manual form of filtering apparatus 70. The elements of this form of the invention, where similar to those described above, will be designated by prime numerals. This apparatus 70 has a single filter 22', in which the end cap 25' rests on an O-ring or suitable sealing means 72, located in a groove 73 formed in bottom 19', to thereby prevent sludge or other matter from moving to the bottom 19' of the filter bowl 18'. Thus, the liquid to be filtered may be channeled through the filter element to the mounting tube 20'and may also fall through the perforations 74 formed in the bottom filter plate 27' and through the opening 75 formed in the lower portion of tube 20'. Filter element 22' is not rotatable in apparatus 70; however, a hand cleaning means or scoop 76 may be moved relative to the top surface of filter element 22' to scrape off the spent filter cake and residue. This cleaning scoop 76 includes a front edge 78 which is beveled rearwardly to direct the residue into the interior of the scoop. Edge 78 is also inclined at a downward angle outwardly from the center, to conform to the plane of the surface of the filter element 22'. The scoop 78 also includes a mounting ring portion 80 which may be placed over the mounting tube 20' to lock the scoop 78 in position and permit it to be rotated around the mounting tube 20 along the top surface of the filter element 22'. The apparatus 70 is otherwise similar to the filtration apparatus 10, including the means for recirculating the cooking liquid and means 48' to divert such liquid to produce a vortex-like flow on readmission of filtered liquid into the bowl 18'.

Both embodiments of the present invention include snap ring coupling means 66 for quick connects and disconnects between a discharge outlet 81 and the deep fryer through flexible tubing 68 which permit the return of filtered cooking liquid to the deep fryer. Return is accomplished by moving the valve 64 to a return position, shown in FIGS. 2 and 3, so that the pump 50 directs the liquid to the deep fryer rather than through the recirculating conduit 54.

The present invention may be manufactured from suitable materials which should be resistant to the high temperatures of the cooking oil and easy to clean, such as stainless steel or other steel alloys. In addition, these materials should be light enough in weight to permit easy portability, which, together with quick, plug-in connections, allow a single unit to service several deep-fryers in an efficient manner.

While the invention has been described in relation to preferred embodiments thereof, it will be apparent to those skilled in the art that the structural details are capable of wide variation without departing from the principles of the invention.

I claim:

1. An apparatus for filtering liquids such as cooking oils, shortening and the like, to remove particulate and chemical contaminants and eliminate odors, including a frame, container means mounted on said frame for receiving said liquid to be filtered and filter cake forming materials, said container means having an inlet and an outlet, pump means mounted on said frame in communication with said inlet and said outlet to circulate said liquid and filter cake forming material to said container through said inlet said inlet including means to create a vortex effect in said container means during circulation of said liquid and filter cake forming material to said container and to uniformly distribute the filter cake forming materials within said container, a generally vertical, hollow mounting tube disposed in said container, said mounting tube having openings formed therein to admit filter liquid into the interior thereof, filter means mounted on said mounting tube to receive and retain the filter cake forming material circulated in said container preventing accumulation of these materials in the bottom of the container, said filter means positioned within said container such that contaminated liquid introduced into said container is filtered through a portion of said filter means into said mounting tube to flow downwardly within said tube toward said outlet from where it may be recycled to said filter means or returned to a source of said liquid for reuse through conduit means in communication with said outlet and said pump means, cleaning means disposed adjacent said filter means and engaging said portion of said filter means through which said liquid passes, and means to effect relative movement between said filter means and said cleaning means such that said cleaning means will remove contaminants and filter cake disposed on said filter means to permit reuse of said filter means.

2. The apparatus of claim 1 wherein said filter means includes support means having a plurality of openings formed therein and supporting a filtering medium on an upper surface thereof which acts to remove said contaminants from said liquid passing therethrough, said filter means being mounted on said mounting tube for rotation about a central axis of said mounting tube, said filter means having an opening formed at an inward end thereof, said opening being in communication with at least one of said openings formed in said mounting tube.

3. The apparatus of claim 1 wherein said cleaning means includes an arm portion disposed across and parallel to said filter means, and a resilient portion mounted on said arm portion and disposed to engage an upper surface of said filter means, said filter means being rotatable relative to said cleaning means about a central axis of said mounting tube such that said cleaning means frictionally engaging said upper surface of said filter means will mechanically remove filter cake and contaminants deposited thereon.

4. The apparatus of claim 3 wherein said arm portion of said cleaning means has one end thereof supported by said mounting tube and extends radially from the central axis of said tube such that said cleaning means engages said upper surface of said filter means to thereby facilitate removal of said contaminants and filter cake from said surface of said filter means.

5. The apparatus of claim 1 wherein said filter means includes a plurality of horizontally disposed filters mounted in vertically spaced relationship on said mounting tube, each of said filters having an opening formed therein adjacent said mounting tube which opening is in communication with at least one of said openings formed in said mounting tube such that said liquid is directed through said filter inwardly into said tube for collection.

6. The apparatus of claim 5 wherein each of said filters has cleaning means associated therewith, said cleaning means including an arm portion having one end thereof supported by said mounting tube and extending radially therefrom and disposed across and parallel to an upper surface of said filter means, and a resilient portion mounted on said arm portion and disposed to engage said upper surface of said filter means so that as said filter means are rotated relative to said cleaning means about the central axis of said mounting tube, said cleaning means will remove spent filter cake and contaminants deposited on said upper surface of each of said filter means.

7. The apparatus set forth in claim 1 wherein said container has a cleanout port formed in a side wall thereof to provide access to the interior of said container, said port being disposed adjacent an outward end of said cleaning means so that said spent filter cake and contaminants will be removed by said cleaning means from said filter means adjacent said port to facilitate their removal from said container.

8. The apparatus of claim 1 wherein said frame has drive means mounted thereon, said drive means being operatively connected to said filter means to rotate said filter means relative to said cleaning means about the central axis of said mounting tube such that said cleaning means engaging said filter means will remove spent filter cake and contaminants deposited on said filter means.

9. The apparatus of claim 1 including junction means mounted on said frame, said junction means in communication with said outlet in said container through a first conduit means, in communication with said inlet in said container through second conduit means, and in communication as desired with a source of said liquid to be filtered through third conduit means, valve means disposed in said junction means and movable therewithin to allow alternate communication of any two of said conduit means and thereby permit recycling of liquid through said container for filtration or return of filtered liquid to said source of liquid.

10. The apparatus of claim 1 wherein said pump means is in communication with said outlet means in said container through a first conduit means and is operable to create a suction through said first conduit means which acts to draw liquid through said filter means downwardly through said mounting tube to said outlet.

11. An apparatus for filtering liquids such as cooking oils, shortening and the like, to remove particulate and chemical contaminants and eliminate odors, including a frame, container means mounted on said frame for receiving said liquid to be filtered, said container means having an inlet and an outlet, pump means mounted on said frame in communication with said inlet and said outlet to circulate said liquid through said container, a generally vertical, hollow mounting tube disposed in said container, said mounting tube having openings formed therein to admit filtered liquid into the interior thereof, filter means mounted on said mounting tube and positioned within said container such that contaminated liquid introduced into said container is filtered through a portion of said filter means into said mounting tube to flow downwardly within said tube toward said outlet from where it may be recycled to said filter means or returned to a source of said liquid for reuse through conduit means in communication with said outlet and said pump means, and cleaning means disposed adjacent said filter means and engaging said portion of said filter means through which said liquid passes, said cleaning means including a body portion having a generally flat base adapted to be positioned adjacent said upper surface of said filter means to scrape said spent filter medium and contaminants from said surface onto said base between generally vertical upwardly extending walls for retaining said medium and contaminants, a handle portion mounted on said body portion and adapted for mounting over said mounting tube to position said body portion relative to said filter means while permitting movement of said cleaning means about said central axis of said mounting tube relative to said filter means.

12. An apparatus for filtering liquids such as cooking oils, shortening and the like, to remove particulate and chemical contaminants and eliminate odors, including a frame, container means mounted on said frame for receiving said liquid to be filtered, said container means having an inlet and an outlet, pump means mounted on said frame in communication with said inlet and said outlet to circulate said liquid through said container, a generally vertical, hollow mounting tube disposed in said container, said mounting tube having openings formed therein to admit filtered liquid into the interior thereof, filter means mounted on said mounting tube and positioned within said container such that contaminated liquid introduced into said container is filtered through a portion of said filter means into said mounting tube to flow downwardly within said tube toward said outlet from where it may be recycled to said filter means or returned to a source of said liquid for reuse through conduit means in communication with said outlet and said pump means, said filter means including a plurality of horizontally disposed filters mounted in vertically spaced relationship on said mounting tube, each of said filters having an opening formed therein adjacent said mounting tube which opening is in communication with at least one of said openings formed in said mounting tube such that said liquid is directed through said filter inwardly into said tube for collection, and cleaning means disposed adjacent said filter means and engaging said portion of said filter means through which said liquid passes, said cleaning means including a wiping arm mounted between and simultaneously engaging a bottom of said container means and engaging a lowermost one of said filter means, said wiping arm being rotatable with said filter means about the central axis of said mounting tube to sweep away any contaminants or filter cake falling to the bottom of said container means during cleaning of said filter means.

13. An apparatus for filtering liquids such as cooking oils, shortening and the like, to remove particulate and chemical contaminants and eliminate odors, including a frame, container means mounted on said frame for receiving said liquid to be filtered and filter cake forming materials, said container means having an inlet and an outlet and a generally circular bowl with a side wall and a bottom wall, said inlet opening thereinto and baffle means to uniformly distribute the filter cake forming materials within said container preventing accumulation of these materials in the bottom of the container, said baffle means associated with said inlet at an angle such that said liquid to be filtered is directed by said inlet and said baffle means into said bowl at an angle generally parallel to said side wall to create a vortex effect within said bowl to uniformly distribute the filter cake forming materials within said container preventing accumulation of these materials in the bottom of the container, evenly distributing said liquid over filter means, pump means mounted on said frame in communication with said inlet and said outlet to circulate said liquid and filter cake forming material through said container, a generally vertical, hollow mounting tube disposed in said container, said mounting tube having openings formed therein to admit filtered liquid into the interior thereof, filter means to receive and retain the filter cake forming material circulated in said container mounted on said mounting tube and positioned within said container such that contaminated liquid introduced into said container is filtered through a portion of said filter means into said mounting tube to flow downwardly within said tube toward said outlet from where it may be recycled to said filter means or returned to a source of said liquid for reuse through conduit means in communication with said outlet and said pump means, cleaning means disposed adjacent said filter means and engaging said portion of said filter means through which said liquid passes, and means to effect relative movement between said filter means and said cleaning means such that said cleaning means will remove contaminants and filter cake disposed on said filter means to permit reuse of said filter means.

14. In a portable apparatus particularly adapted for filtering liquids such as cooking oils, shortening and the like, to remove particulate and chemical contaminants and eliminate odors, including a filter bowl for receiving the liquid to be filtered and filter cake forming materials, said filter bowl having an inlet and an outlet, pump means in communication with said inlet and said outlet to circulate said liquid and filter cake forming material to said filter bowl through said inlet, said inlet including means to create a vortex effect in said filter bowl during circulation of said liquid and filter cake forming material to said container to assure even distribution of said liquid and to uniformly distribute the filter cake forming materials within said container preventing accumulation of these materials in the bottom of the container, a generally vertical, hollow mounting tube mounted in said filter bowl near the center thereof, said mounting tube having openings formed therein to admit filtered liquid into the interior thereof, filter means to receive and retain the filter cake forming material circulated in said container generally horizontally mounted on said mounting tube within said filter bowl such that said liquid is caused to flow through a portion of said filter means, into said mounting tube and downwardly toward said outlet in said filter bowl, and cleaning means mounted within said filter bowl adjacent said filter means and engaging said portion of said filter means through which said liquid passes, said filter means being rotatable about a central axis of said mounting tube relative to said cleaning means such that said cleaning means will remove said contaminants and spent filter cake formed on said portion of said filter means to permit reuse of said filter means.

15. The improvement set forth in claim 14 wherein said cleaning means includes an arm portion disposed in a radial manner across and parallel to said filter means, and a resilient portion mounted on said arm portion and disposed to frictionally engage an upper surface of said filter means, said filter means being rotatable relative to said cleaning means about a central axis of said mounting tube such that a resilient portion of said cleaning means engaging said upper surface of said filter means will remove spent filter cake and contaminants deposited thereon.

16. The improvement set forth in claim 15 wherein said portion of said cleaning means has one end thereof supported by said mounting tube and extends radially from the central axis of said tube such that said cleaning means engages said upper surface of said filter means to facilitate removal of said contaminants and spent filter cake from said surface of said filter means.

17. The improvement set forth in claim 14 wherein said filter means includes a plurality of horizontal disposed filters mounted in vertically space relationship on said mounting tube, each of said filters having an opening formed therein adjacent said mounting tube which opening is in communication with at least one of said openings formed in said mounting tube such that said liquid to be filtered is directed through said filter inwardly into said tube for collection, each of said filters having cleaning means associated therewith, each of said cleaning means including a radially extending arm portion having one end thereof supported by said filter tube across and parallel to an upper surface of each of said filters, and a resilient portion mounted on said arm portion and engaging said upper surface of each of said filters so that as said filters are rotated relative to said cleaning means about the central axis of said mounting tube, said cleaning means will remove filter cake and contaminants deposited on said upper surface of each of said filters.

18. The improvement set forth in claim 14 wherein said cleaning means includes a radially extending wiping arm mounted between the bottom of said filter bowl and said filter means, said wiping arm being rotatable with said filter means about the central axis of said mounting tube to sweep the bottom of said filter bowl clean of any contaminants or spent filter cake which has fallen to the bottom of said filter bowl means during cleaning of said filter means.

19. In a portable apparatus particularly adapted for filtering liquids such as cooking oils, shortening and the like, to remove particulate and chemical contaminants and eliminate odors, including a filter bowl for receiving the liquid to be filtered and filter cake forming materials, said filter bowl having an inlet and an outlet, said inlet opening thereinto including baffle means associated with said inlet at an angle to create a vortex effect within said bowl and to uniformly distribute the filter cake forming materials within said container preventing accumulation of these materials in the bottom of the container evenly distributing said liquid over filter means, a generally vertical, hollow mounting tube mounted in said filter bowl near the center thereof, said mounting tube having openings formed therein to admit filtered liquid into the interior thereof, filter means to receive and retain the filter cake forming material circulated in said container generally horizontally mounted on said mounting tube within said filter bowl such that said liquid is caused to flow through a portion of said filter means, into said mounting tube and downwardly toward said outlet in said filter bowl, and cleaning means mounted within said filter bowl adjacent said filter means and engaging said portion of said filter means through which said liquid passes, said filter means being rotatable about a central axis of said mounting tube relative to said cleaning means such that said cleaning means will remove said contaminants and spent filter cake formed on said portion of said filter means to permit reuse of said filter means.

* * * * *